US007399098B2

(12) United States Patent
Nakamoto et al.

(10) Patent No.: US 7,399,098 B2
(45) Date of Patent: Jul. 15, 2008

(54) ILLUMINATING APPARATUS FOR OPERATING SECTION

(75) Inventors: Hiroshi Nakamoto, Neyagawa (JP); Yasuyuki Sakamoto, Moriguchi (JP); Tomoki Sakamoto, Katano (JP); Kiyotaka Matsuura, Hirakata (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/552,921

(22) PCT Filed: Apr. 19, 2004

(86) PCT No.: PCT/JP2004/005576

§ 371 (c)(1), (2), (4) Date: Oct. 11, 2005

(87) PCT Pub. No.: WO2004/093111

PCT Pub. Date: Oct. 28, 2004

(65) Prior Publication Data

US 2006/0227528 A1 Oct. 12, 2006

(30) Foreign Application Priority Data

Apr. 18, 2003 (JP) ............................ 2003-113853
Jul. 11, 2003 (JP) ............................ 2003-273318

(51) Int. Cl.
*G01D 11/28* (2006.01)

(52) U.S. Cl. ............................ 362/29; 362/23; 362/26; 362/30

(58) Field of Classification Search .................. 362/29, 362/23, 26, 27, 28, 30
See application file for complete search history.

(56) References Cited

U.S. PATENT DOCUMENTS

| | | | | |
|---|---|---|---|---|
| 4,800,466 | A * | 1/1989 | Bauer et al. | 362/26 |
| 5,697,689 | A * | 12/1997 | Levine et al. | 362/29 |
| 6,092,902 | A * | 7/2000 | Weber et al. | 362/28 |
| 6,876,313 | B2 * | 4/2005 | Hsiung et al. | 362/29 |

FOREIGN PATENT DOCUMENTS

| | | |
|---|---|---|
| JP | 55-8990 | 7/1953 |
| JP | 29490/1981 | 3/1981 |
| JP | 61-24920 | 2/1986 |
| JP | 61-40692 | 3/1986 |
| JP | 40692/1986 | 3/1986 |

(Continued)

OTHER PUBLICATIONS http://wordnet.princeton.edu/perl/webwn!s=matted.*

*Primary Examiner*—Ali Alavi
*Assistant Examiner*—William J Carter
(74) *Attorney, Agent, or Firm*—Steptoe & Johnson LLP

(57) ABSTRACT

The present invention is configured so that one light emission source such as a light emitting diode is placed inside an operation knob in front of a light guiding piece or in a bearing of the operation knob. A light beam from the light emission source is emitted to the interior of the operation knob. A reflected indirect light irregularly reflected inside the operation knob is received by the light guiding piece located at a rear surface of the operation knob. The light guiding piece has a transmission and diffusion function. The light is then guided toward an outer periphery to illuminate the rear surface of the operation knob.

14 Claims, 11 Drawing Sheets

FOREIGN PATENT DOCUMENTS

| | | | |
|---|---|---|---|
| JP | 1-119135 | | 8/1989 |
| JP | 136985/1989 | | 9/1989 |
| JP | 2-17804 | | 2/1990 |
| JP | 3-44713 | | 4/1991 |
| JP | 3-45603 | | 4/1991 |
| JP | 06-171345 | A | 6/1994 |
| JP | 73829/1994 | | 10/1994 |
| JP | 06-348213 | A | 12/1994 |
| JP | 3023853 | | 2/1996 |
| JP | 10-283867 | A | 10/1998 |
| JP | 10-283882 | | 10/1998 |
| JP | 10-283882 | A | 10/1998 |
| JP | 11-353976 | | 12/1999 |
| JP | 20000-133072 | A | 5/2000 |
| JP | 2001-066533 | | 3/2001 |
| JP | 2001-222243 | A | 8/2001 |
| JP | 2001-229779 | | 8/2001 |
| JP | 2001-229779 | A | 8/2001 |
| JP | 2001-236860 | | 8/2001 |
| JP | 2002-358853 | | 12/2002 |

* cited by examiner

ILLUMINATING APPARATUS FOR OPERATING SECTION

TECHNICAL FIELD

The present invention relates to an illumination apparatus for an operating section of an electronic equipment such as an audio equipment or a communication equipment.

BACKGROUND ART

FIG. 11 is a schematic sectional view of a conventional light ring apparatus (JP281586 B). FIG. 12 is a sectional view taken along a line A-A in FIG. 11. FIG. 13 is a schematic front view showing a base of the conventional light ring apparatus and light emitting diodes installed on the base.

As shown in FIGS. 11 and 12, the light ring apparatus 30 is cylindrical and has nine chambers 31 formed at equal intervals and which are partitioned by three inclined triangular surfaces 31A. A vertex 32 of the triangular surfaces 31A of each chamber 31 is located at the outermost position of the central triangular surface 31A and at the outermost peripheral position of interior of the light ring apparatus 30. A tip portion of each light emitting diode 33 is placed substantially opposite the vertex 32 of the triangular surfaces. As shown in FIG. 12, if the triangular surfaces 31A are viewed from behind, ridge portions 34 and valley portions 35 all extending linearly are formed at equal intervals. Each chamber 31 functions as a light receiving surface that receives light from the corresponding light emitting diode 33. The chamber 31 sufficiently diffuses the light from the light emitting diode 33 and guides it to an upper portion 36 of the light ring apparatus 30. Then, the light guided into the upper portion 36 is introduced into a ring portion 37 and is viewed by a user.

Such an illumination apparatus requires two or more light emission sources in order to allow the ring portion 37 to emit light evenly. Further, there must be a long distance between the light emission sources and a ring-like illumination visible portion of an operation knob. Accordingly, if the light emission sources are arranged inside the operation knob, strict limitations are imposed on the arrangement and design of the parts.

DISCLOSURE OF THE INVENTION

It is an object of the present invention to provide a high-grade illumination apparatus for an operating section which enables parts to be arranged within a minimum range without increasing the length of a shaft of the operating section by minimizing a shadow of a bearing section of an operation knob or button, and an operation part fitted into the bearing section, such as a shaft section of a volume. Further, by arranging a light emission source in front of a light guiding piece inside the operation knob or in a shaft section of the operation part, it becomes possible to arrange the parts in the minimum range without making the shaft longer, to reduce the limitations on the arrangement and design of the parts, and to avoid variation in luminance and nonuniformity of illumination.

To accomplish the object, a first illumination apparatus for an operating section according to the present invention is characterized in that a light emission source is provided above a bearing section of an operation knob, and a light guiding piece is placed between the operation knob and a panel to diffusively transmit light from the light emission source to illuminate a rear surface of the operation knob.

With this configuration, the light guiding piece allows the light from the light emission source to be diffusively reflected by an outer peripheral portion of an opening in the operation knob. This indirectly increases the distance between the light emission source and the outer peripheral section of the knob, which is an illuminated portion. At the same time, the diffusion effect based on the reflection allows the illuminated portion to be uniformly illuminated.

Further, according to the present invention, the light emission source is provided above the bearing of the operation knob. Consequently, even with the single light emission source, the light guiding piece in the rear of the operation knob diffusively reflects the light from the light emission source to make the light uniform. The uniform light then uniformly illuminates the illuminated portion. Further, slight nonuniformity in light emission can be made insignificant.

In the present invention, according to the first aspect, it is characterized in that at least one of a shaft section of an operation part and the bearing section of the operation knob fitted into the shaft section is a transparent material.

With this configuration, the light from the light source located offset from the center of the shaft passes through the shaft section of the operation part and the bearing of the operation knob. This minimizes the shadow of the shaft. Further, the light guiding piece in the opening in the operation knob diffusively reflects the light to make it uniform. The uniform light then uniformly illuminates the illuminated portion.

An illumination apparatus for an operating section according to a second aspect of the present invention is characterized in that each of a shaft section of an operation part and a bearing section of an operation knob is a transparent material, and in that a light source is provided inside in at least one of the shaft section of the operation part and the bearing section of the operation knob, and a light guiding piece is placed between the operation knob and a panel to diffusively transmits light from the light emission source to illuminate a rear surface of the operation knob.

This configuration enables the parts to be arranged and configured within a minimum range without increasing the length of the shaft of the operating section. It can also reduce limitations on the arrangement and design of the parts and avoid a difference in illumination luminance and nonuniformity of illumination.

The first and second aspects of the present invention are further characterized in that at least one of an internal wall surface of the operation knob and a panel surface on the rear surface of the light guiding piece is a reflection surface. Further characterized is in that a part or the whole of the rear surface of the light guiding piece is a reflection surface and an outer peripheral section at a front surface of the light guiding piece is an emission surface processed to form a diffusive refection surface (matted).

This reflection surface can efficiently reflect the light from the light emission source to the light guiding piece. It is thus possible to suppress attenuation of the light from the light emission source.

The first and second aspects of the present invention are further characterized in that a light receiving surface of the light guiding piece which receives the light from the light emission surface faces an interior of the operation knob and the emission surface is located around the outer peripheral section of the operation knob, and the light diffusively passing through the light guiding piece is emitted frontward of the light guiding piece from the emission surface.

The first and second aspects of the present invention are further characterized in that a through-hole is formed in the operation knob so that the transmitted or diffused light is emitted through the through-hole.

The first and second aspects of the present invention are further characterized in that a concave is formed in the panel surface to which the operation part is attached, and the light guiding piece is placed in the concave.

BEST MODE FOR CARRYING OUT THE INVENTION

First Embodiment

A first embodiment 1 of the present invention will be described below with reference to FIGS. 1 to 3.

Figure 1:
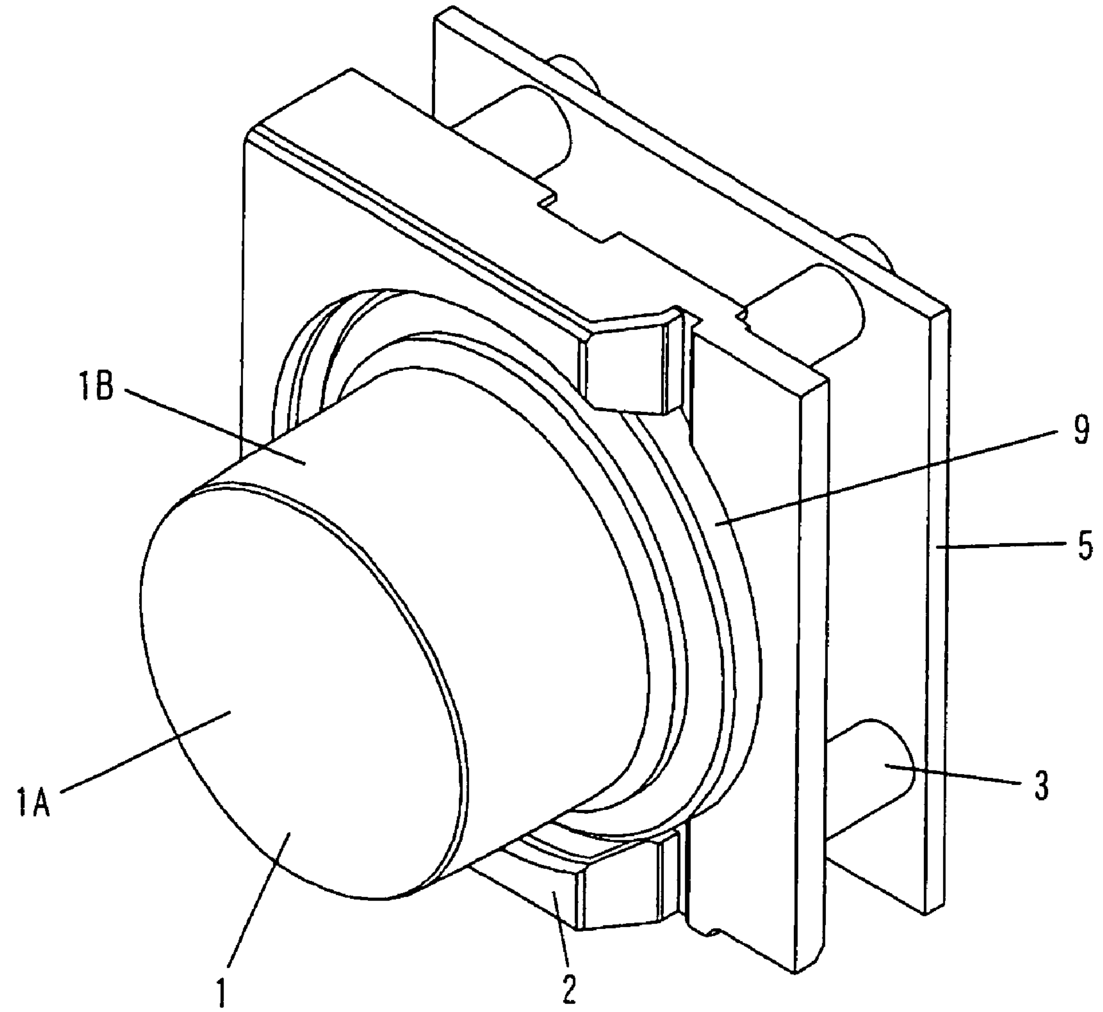
FIG. 1 is a perspective view of an illumination apparatus according to a first embodiment of the present invention.

FIG. 1 is a perspective view of an illumination apparatus according to the first embodiment of the present invention. FIG. 2 is a sectional side view of the illumination apparatus according to the first embodiment of the present invention. FIG. 3 is a partial sectional perspective view of the illumination apparatus according to the first embodiment of the present invention.

Figure 2:
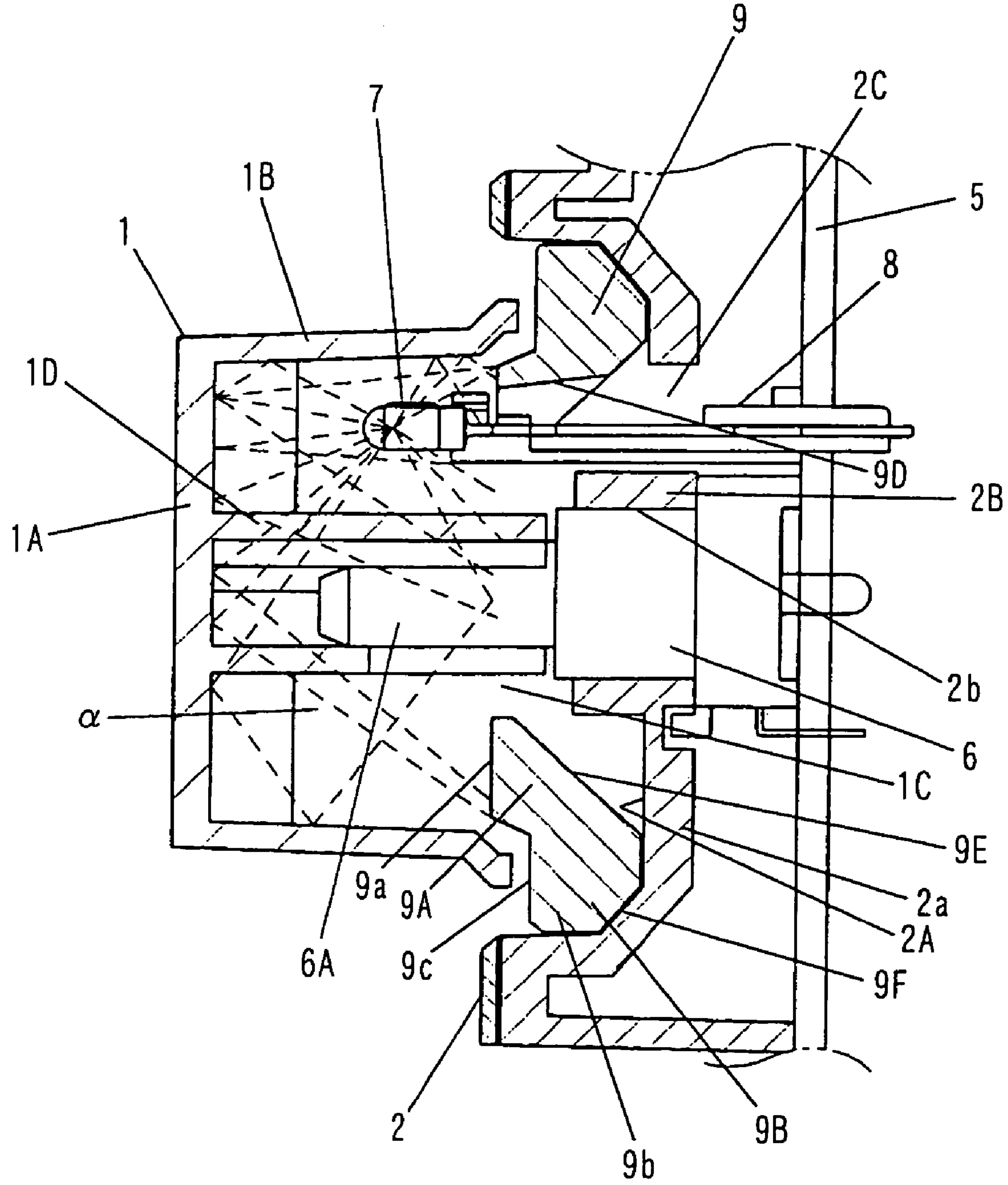
FIG. 2 is a sectional side view of the illumination apparatus according to the first embodiment of the present invention.
Figure 3:
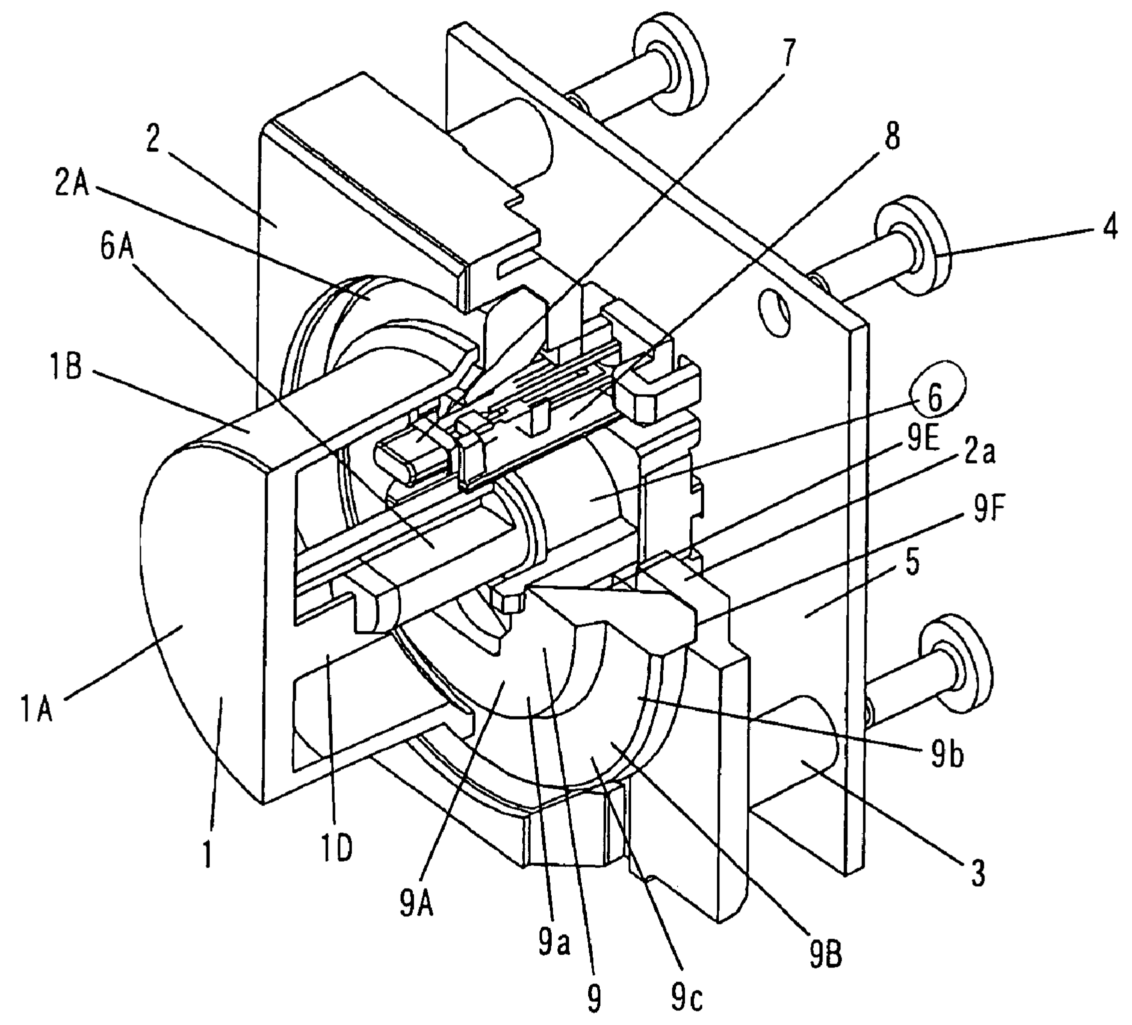
FIG. 3 is a partial sectional perspective view of the illumination apparatus according to the first embodiment of the present invention.

In FIGS. 1 to 3, reference numeral 1 denotes an operation knob. The operation knob 1 is shaped like a cup and has an outer peripheral section 1B around an outer periphery of a disk-like front plate 1A. A cylindrical bearing section 1D is formed in the center of a rear surface of the front plate 1A so as to extend toward an opening 1C located at a rear surface of the operation knob 1. The operation knob 1 is provided as a molded article of a synthetic resin. However, the material for the operation knob 1 is not limited to the synthetic resin. The bearing section 1D is preferably made of a transparent material. However, the parts (front plate 1A and outer peripheral section 1B) of the operation knob 1 other than the bearing section 1D are not transparent.

Reference numeral 2 denotes a panel fixed by a fixing screw 4 to a printed circuit board 5 via a leg section 3. A circular concave 2A is formed in the panel 2. A boss 2B is formed in a central portion of a rear plate 2*a* of the recess 2A. An operation part 6 is mounted in a boss hole 2*b* in the boss 2B. In the description of this embodiment, a volume (hereinafter referred to as a VR) is provided as the operation part 6. However, of course, the operation part 6 is not limited to the volume but may be a variable capacitor, a push button type switch, or the like. The type of the part is not limited.

A shaft section 6A of the VR 6 is fitted into the cylindrical bearing section 1D of the operation knob 1. The VR 6 can be operated by using the operation knob 1 to rotatively move the shaft section 6A. The shaft section 6A of the VR 6 is preferably produced using a transparent material such as polycarbonate. By providing at least one of the bearing section 1D and the shaft section 6A of the VR 6 using a transparent material such as polycarbonate, it is possible to transmit light from a light emission source (light emitting diode) 7, described later, to reduce attenuation of light. A rear end of the VR is mounted on the printed circuit board and connected to wiring on the circuit board 5.

The light emitting diode 7 is supported at the tip of a rectangular holder 8. The light emitting diode 7 is placed so as to enter the operation knob 1 through a through hole 2C formed in the rear plate 2*a* of the panel 2, located above the VR 6, and through a hole 9D in a light guiding piece 9. The light emitting diode 7 is located above the bearing section 1D of the operation knob 1 so as to irradiate an inner surface of the operation volume with light. A rear end of the holder 8 for the light emitting diode 7 is fixed to the printed circuit board 5, located above the VR 6. In the description of this embodiment, the light emitting diode is used as a light emitting section. However, of course, the present invention is not limited to the light emitting diode.

The light guiding piece 9, made of a translucent material, is provided in the concave 2A in the panel 2, which is opposite the opening 1*c* in the operation knob 1. The light guiding plate 9 is made of an acrylic resin, and light emitted by the light emitting diode 7 passes diffusively through the resin. The light guiding piece 9 is formed to be circular so as to be fitted into the concave 2A in the panel 2. An inner peripheral section 9A of the light guiding piece 9 is formed to be thicker than an outer peripheral section 9B. A thicker part of the inner peripheral section 9A is located inside the operation knob 1, while the outer peripheral section 9B is located around an outer periphery of the operation knob 1, as viewed from front of the apparatus. A front surface of the inner peripheral section 9A of the light guiding piece 9 faces the inside of the operation knob 1 so as to act as a light receiving surface 9*a* that receives light from the light emitting diode 7. An outer periphery 9*b* of the outer peripheral section 9B of the light guiding piece 9 protrudes outward from the outer peripheral section 1B of the operation knob 1. The outer periphery 9*b* acts as an emission surface 9*c* that irradiates front of the light guiding piece 9 with light diffusively transmitted through the light guiding piece 9. The emission surface 9*c* is preferably matted. In the above description, the material for the light guiding piece 9 is the acrylic resin. However, the present invention is not limited to this aspect but the light guiding piece 9 may be composed of another translucent material.

The hole 9D is formed in the central portion of the light guiding piece 9 so that the shaft section 6A of the VR 6 and the holder 8 for the light emitting diode 7 can pierce the hole 9D toward the operation knob 1. Further, a first reflection surface 9E is formed on a rear surface of the inner peripheral portion 9A of the light guiding piece 9 to reflect light outward from the light receiving surface 9*a*. The reflection surface 9E is inclined at 45° to the axis of the bearing section 1D to reflect the light from the light receiving surface 9*a* radially outward of the light guiding piece 9. Moreover, a second reflection surface 9F is formed on the rear surface of the outer peripheral section 9B of the light guiding piece 9 to reflect the light reflected by the first reflection surface 9E toward the emission surface 9*c*. The second reflection surface 9F is inclined at 50°. The first reflection surface 9E and the second reflection surface 9F may be mirrored. Further, the rear surface of the light guiding piece 9 may be entirely mirrored. However, these surfaces need not necessarily be mirrored. In the above description, the reflection surfaces 9E and 9F are inclined at 45° and 50°, respectively. However, the present invention is not limited because effective reflection and light guidance are accomplished on the basis of the position and size of the emission surface 9*c* of the light emitting diode 7. Further, one of an inner wall surface of the operation knob 1 and a surface of the panel 2 at the rear surface of the light guiding piece is preferably mirrored so as to operate as a reflection surface.

Description will be given below of the operation of the illumination apparatus for an operating section configured as described above. First, part of light emitted by the light emitting diode 7 travels directly toward the opening 1C at the rear surface of the operation knob 1. Further, as shown by an illumination reflected beam α, part of the light is reflected by the inner walls of the front plate 1A and outer peripheral section 1B of the operation knob 1. Part of the light passes through the bearing section 1D made of the transparent material and the shaft section 6A toward the opening 1C at the rear surface of the operation knob 1. The light directed to the opening 1C enters the light guiding piece 9 through the light receiving surface 9*a*. The light is then reflected by the first reflection surface 9E and the second reflection surface 9F and then emitted from the emission surface 9*c*. Further, part of the light is diffusively reflected inside the light guiding piece 9, made of the translucent material, and is then emitted from the emission surface 9*c*. In this manner, a ring-like illumination visible section (emission surface 9*c*) of the light guiding piece 9 illuminates the operation knob 1 from the rear surface.

As described above, according to the present embodiment, light from the point light source of the light emitting diode 7 is diffusively reflected through the opening 1C toward the outer periphery, the opening being located at the rear surface of the operation knob 1. This indirectly provides a longer distance between the light source and the outer peripheral section of the operation knob 1 which is a to-be-illuminated portion. At the same time, the diffusion effect based on the reflection in the light guiding piece 9 enables the illuminated portion to be uniformly illuminated.

Further, the light emitting diode 7 is provided above the bearing section 1D of the operation knob 1, so that a user viewing the operating section gets an impression that the light guiding piece 9 is emitting a uniform light. Specifically, when only one light emitting diode 7 is provided in the operation knob 1, although the light guiding piece 9 close to the light emitting diode 7 and its proximity become bright, other parts being farther away from the light emitting diode get darker. Accordingly, when the light emitting diode 7 is provided above the bearing section 1D of the operation knob 1, the upper part of the light guiding piece 9 gets bright, while the lower part gets darker. However, an indoor illumination is commonly provided from above an electronic equipment. Accordingly, users have a fixed idea that the upper part of the operation knob is bright, while the lower part is dark owing to a shadow. Consequently, even though the upper part of the light guiding piece is dark, whereas the lower part is dark, a user viewing the operating section gets a mistaken impression that the light guiding piece 9 is emitting a uniform light. Therefore, the light emitting diode 7 is advantageously provided above the bearing section 1D of the operation knob 1.

Second Embodiment

Figure 4:
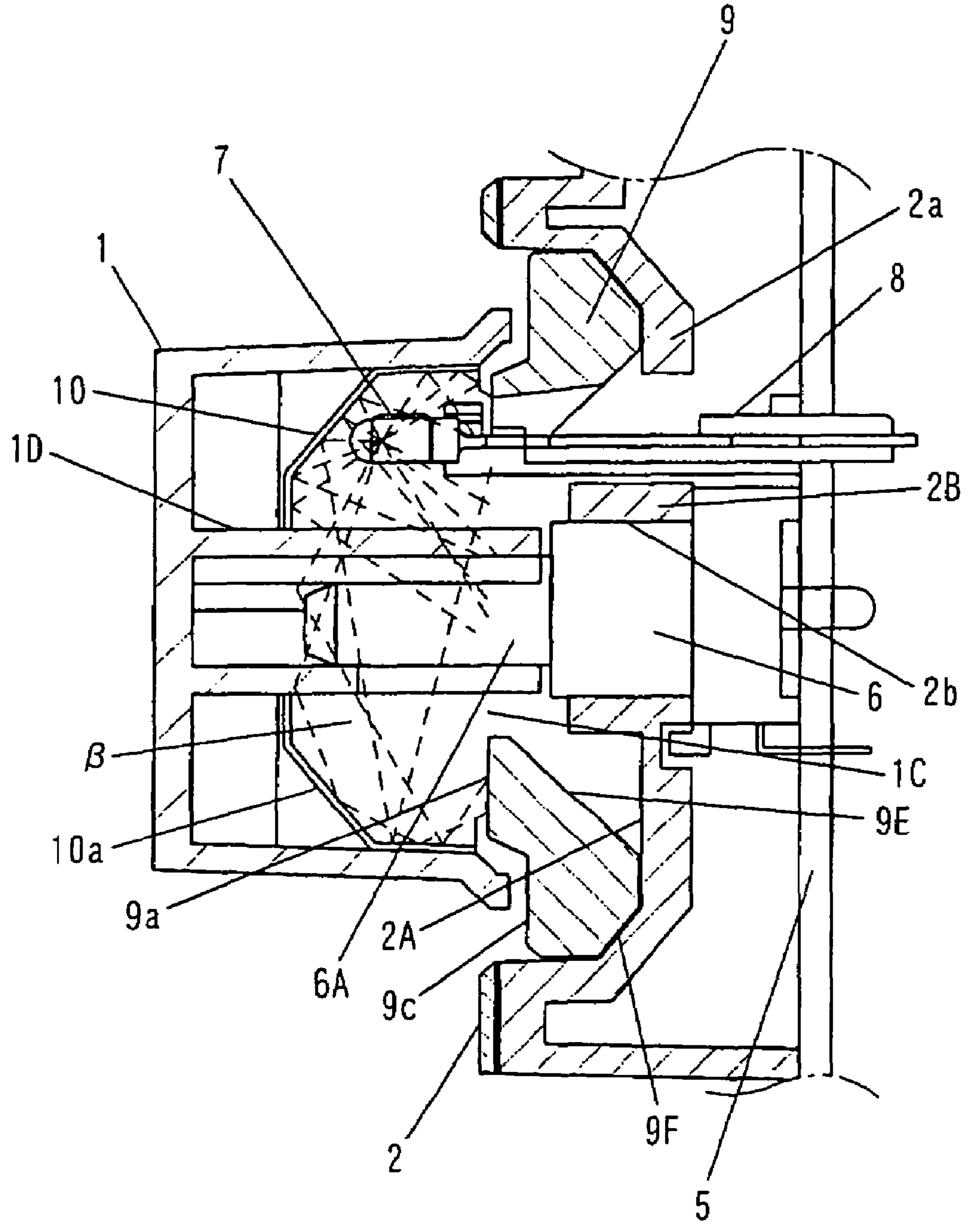
FIG. 4 is a sectional side view of an illumination apparatus according to a second embodiment of the present invention.
Figure 5:
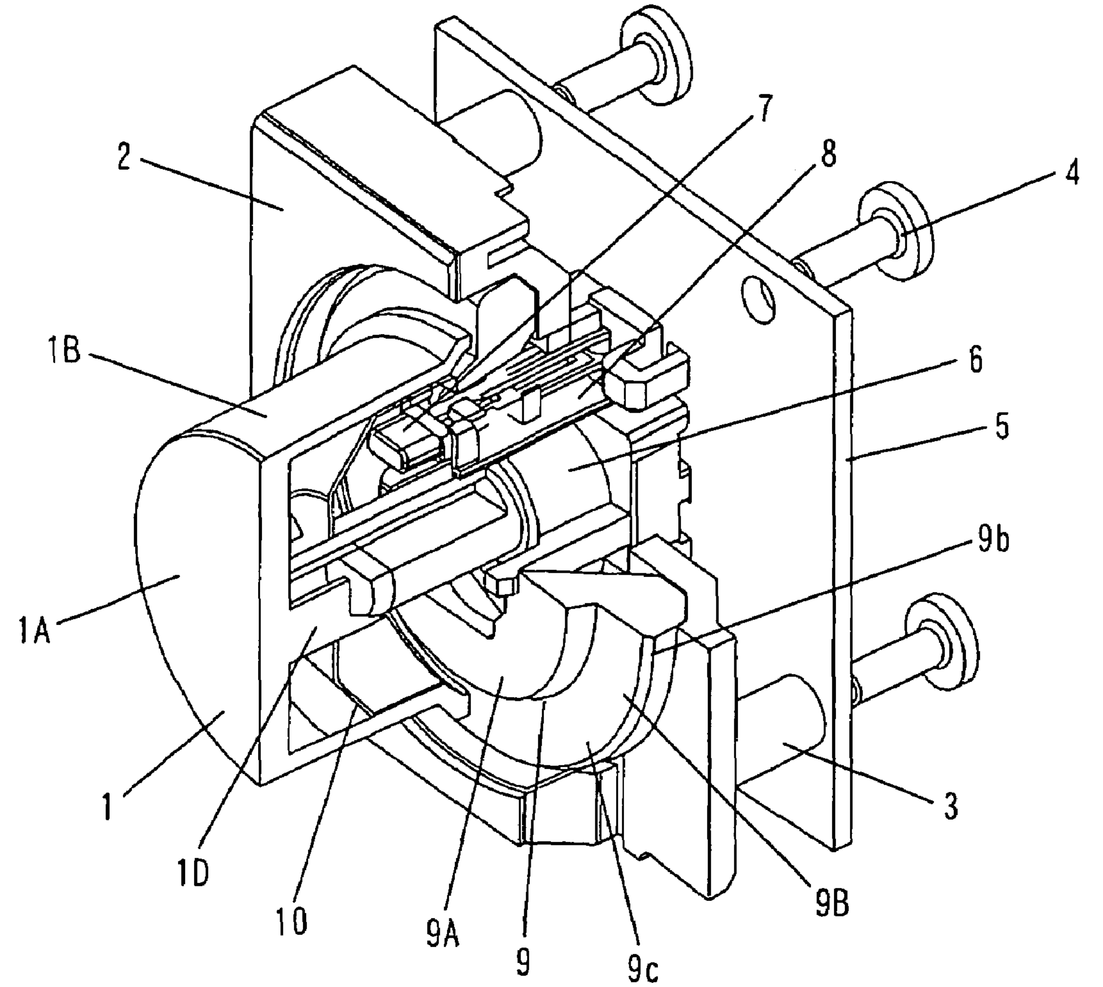
FIG. 5 is a partial sectional perspective view of the illumination apparatus according to the second embodiment of the present invention.

FIG. 4 is a sectional side view of a second embodiment of the present invention. FIG. 5 is a partial sectional perspective view of the second embodiment of the present invention. The illumination apparatus in FIGS. 4 and 5 is similar to the illumination apparatus for the operating section according to the first embodiment except that in addition to the configuration of the first embodiment, the second embodiment has a reflection case 10 provided in a part of the interior of the operation knob 1 and shaped like a truncated cone. Accordingly, the same components are denoted by the same reference numerals and their detailed description is omitted. The reflection case 10 is made of a synthetic resin and has a reflection surface on an inner surface of a plate shaped like a truncated cone. A slope 10*a* of the reflection case 10, shaped like a truncated cone, enables light from the light emitting diode 7 to be effectively diffusively reflected to the opening 1C in the operation knob 1, as shown by an illumination reflected beam β. The reflection case 10 need not be shaped like a truncated cone. It may be shaped to reflect light to the opening 1C in the operation knob 1. In this description, the material for the reflection case 10 is the synthetic resin. However, the present invention is not limited to this aspect but another material having a reflection surface, for example, a metal plate may be used.

As described above, according to the present embodiment, light from the light source can be effectively diffusively reflected regardless of the sectional shape of the operation knob 1. Moreover, the illuminated portion can be uniformly illuminated.

Third Embodiment

Figure 6:
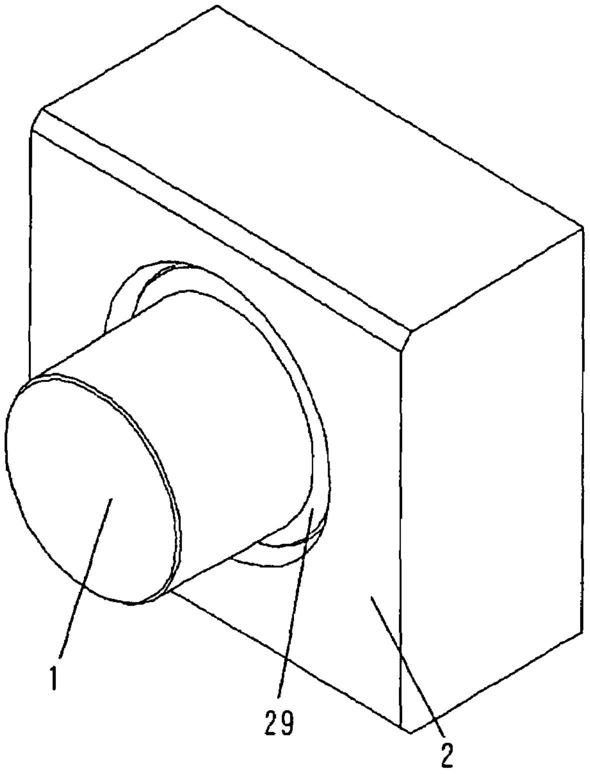
FIG. 6 is a perspective view of an illumination apparatus according to a third embodiment of the present invention.
Figure 7:
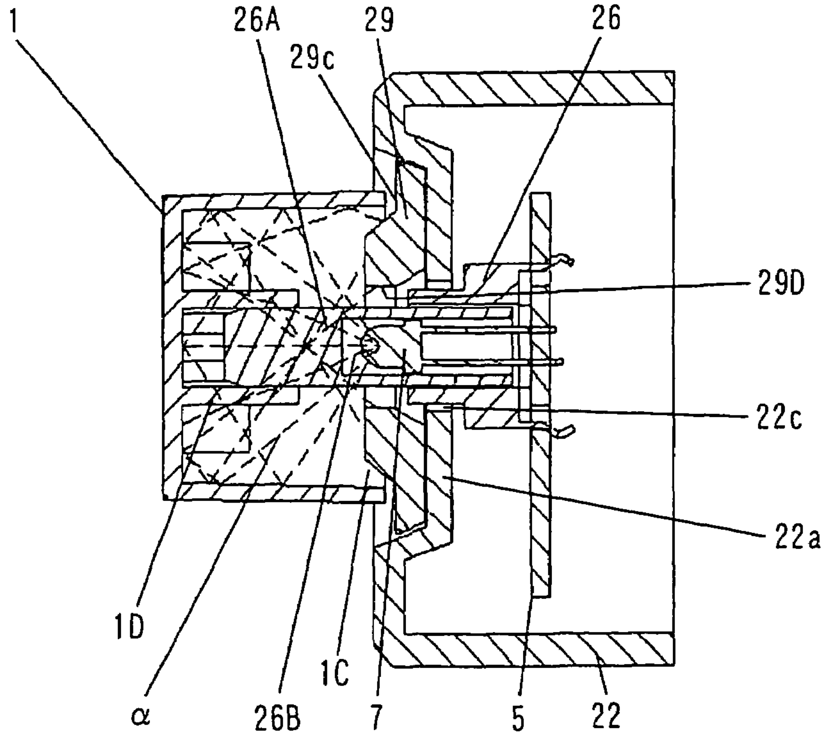
FIG. 7 is a sectional side view of the illumination apparatus according to the third embodiment of the present invention.
Figure 8:
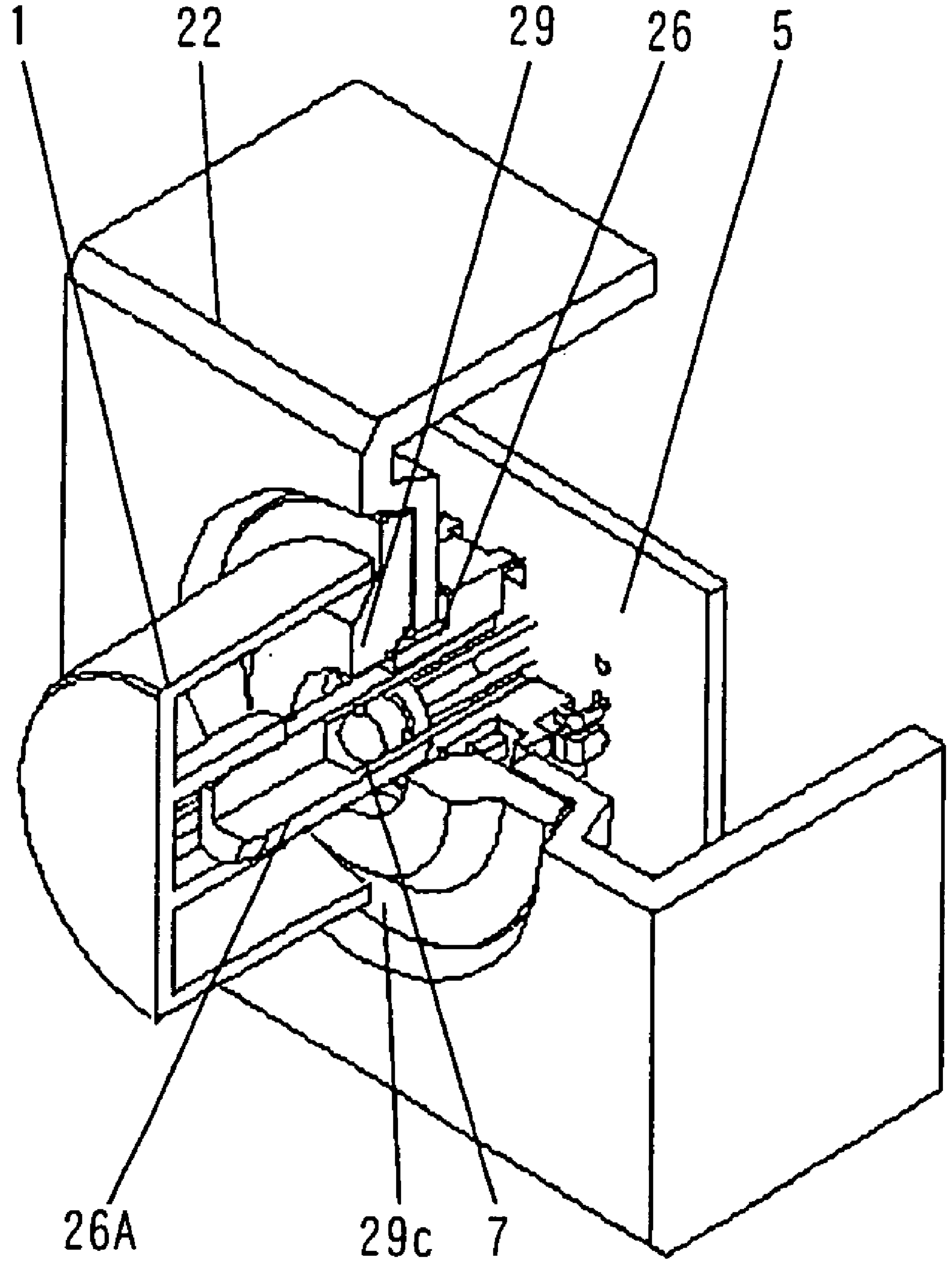
FIG. 8 is a partial sectional perspective view of the illumination apparatus according to the third embodiment of the present invention.

FIG. 6 is a perspective view of a third embodiment of the present invention. FIG. 7 is a sectional side view of the third embodiment of the present invention. FIG. 8 is a partial sectional perspective view of the third embodiment of the present invention.

The third embodiment is substantially similar to the illumination apparatus for the operating section according to the first embodiment in terms of the operation knob 1 and the printed circuit board 5. Accordingly, the same components are denoted by the same reference numerals and their detailed description is omitted.

In the third embodiment, a shaft section 26A of a VR 26 differs from that in the first embodiment. The shaft section 26A is made of a transparent material such as polycarbonate or a transmission and diffusion material. A concave portion 26B open to the circuit board 5 is formed in the shaft section 26A so that the light emitting diode 7 can be fitted into the concave portion 26B. The light emitting diode 7 is fitted into the concave portion 26B in the shaft section 26A of the VR 26.

The shaft section 26A protrudes through a through-hole 22*c* formed in a concave rear plate 22*a* of a panel 22 and through a central hole 29D formed in a light guiding piece 29. The shaft section 26A is then fitted into the bearing section 1D of the operation knob 1.

In spite of a slight difference in shape, the light guiding piece 29, placed between the operation knob 1 and the rear plate 22*a* of the panel 22, basically acts in the same manner as the light guiding piece 9 according to the first embodiment, as described later.

Description will be given of the operation of the illumination apparatus for the operating section configured as described above. First, light emitted by the light emitting diode 7 passes through the shaft section 26A of the VR 26, having the transparent material or a transmission and diffusion function. Part of the light is directly diffusively reflected inside the light guiding piece 29 and then emitted frontward through an emission surface 29*c*. Part of the light is reflected by the inner wall of the operation knob 1 and then travels to the opening 1C in the operation knob 1 as shown by the illumination reflected beam α. Subsequently, the light is diffusively reflected inside the light guiding piece 29, having the transmission and diffusion function. The light is then emitted frontward through the irradiation surface 29*c*. Thus, the light emitted by the light emitting diode 7 uniformly illuminates the ring-like illumination visible portion (29*c*).

As described above, according to the present embodiment, light from the light emitting diode 7 is diffusively reflected through the opening 1C to indirectly provide a longer distance between the light source 7 and the outer peripheral section of the operation knob 1 which is a to-be-illuminated portion. At the same time, the diffusion effect based on the reflection in the light guiding piece enables the illuminated portion 29C to be uniformly illuminated. Further, by placing the light emission source 7 in the concave portion 26B of the VR 26, having the transparent material or the transmission and diffusion function, it is possible to arrange and configure the parts within the minimum range.

Fourth Embodiment

Figure 9:
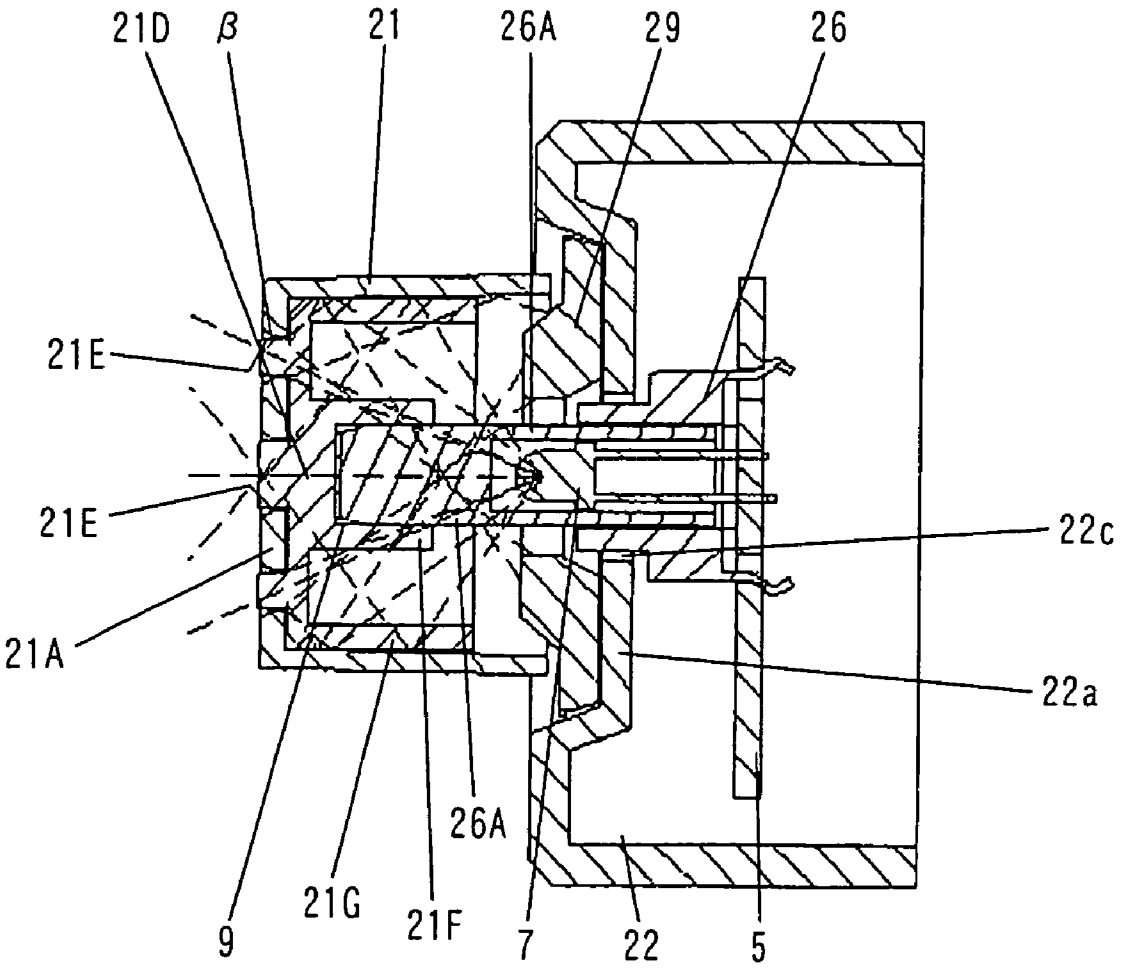
FIG. 9 is a sectional side view of an illumination apparatus according to a fourth embodiment of the present invention.
Figure 10:
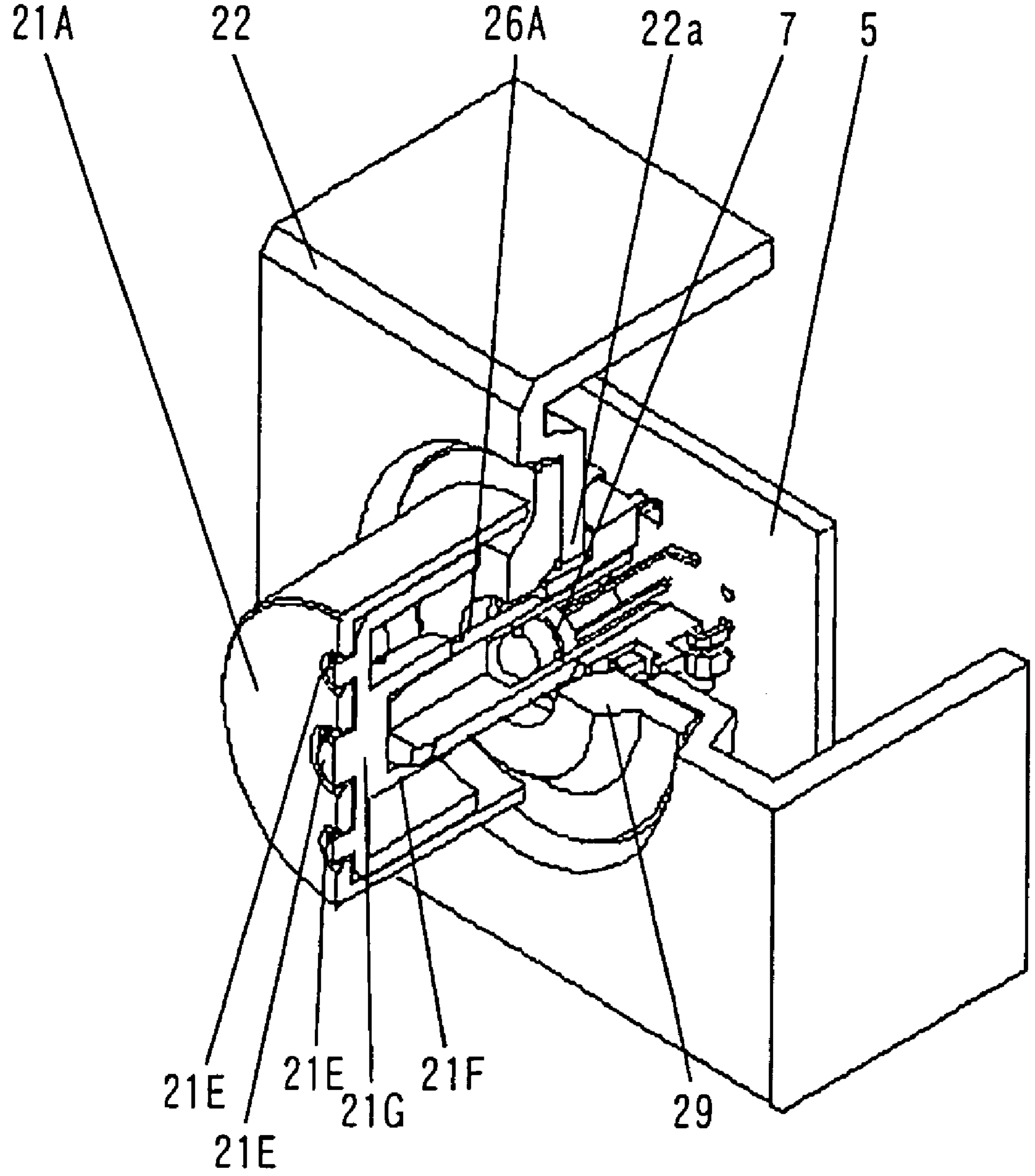
FIG. 10 is a partial sectional perspective view of the illumination apparatus according to the fourth embodiment of the present invention.
Figure 11:
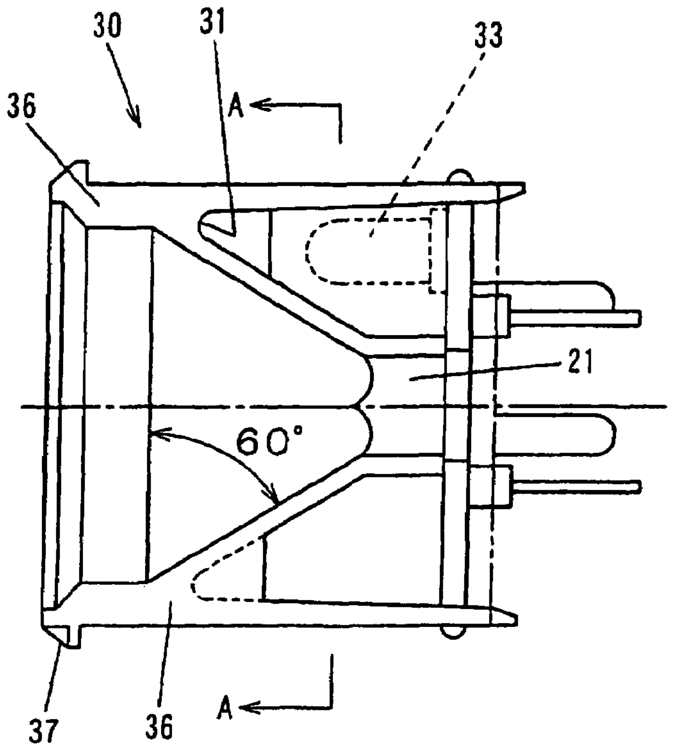
F I G. 1 1 Prior Art
FIG. 11 is a schematic sectional side view of a conventional illumination apparatus.
Figure 12:
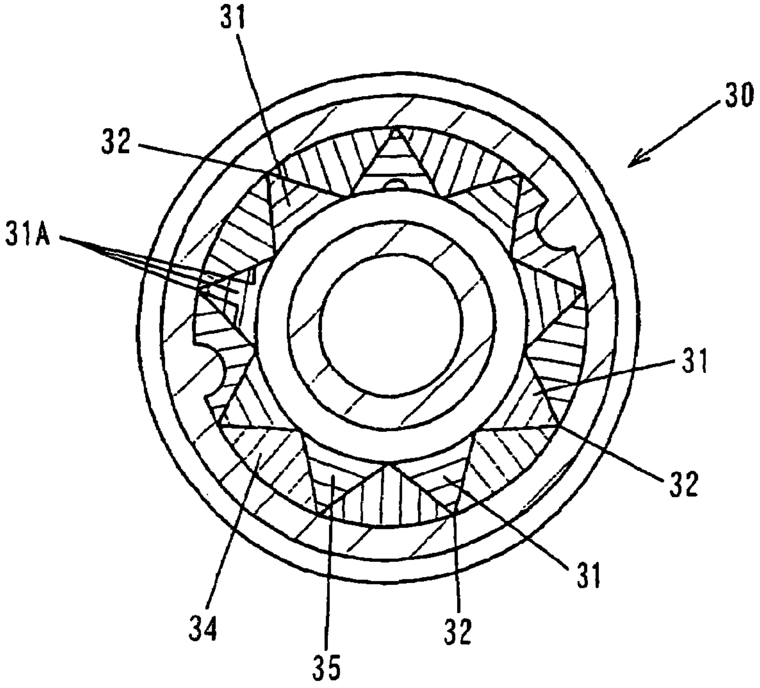
F I G. 1 2 Prior Art
FIG. 12 is a sectional view taken along a line A-A in FIG. 12.
Figure 13:
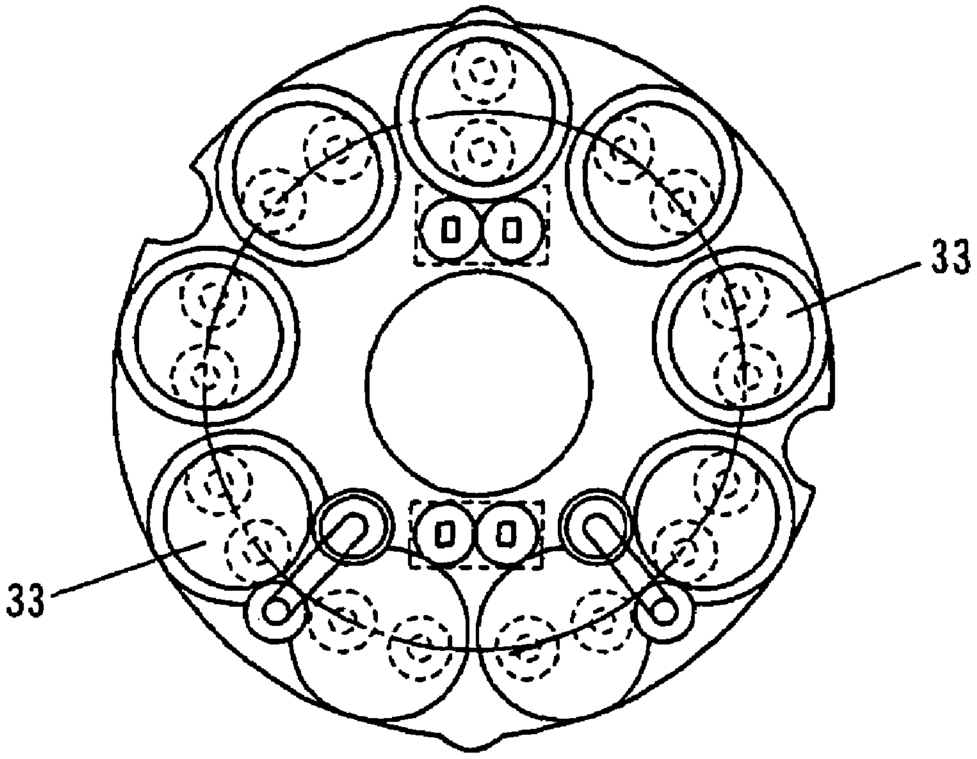
F I G. 1 3 Prior Art
FIG. 13 is a schematic front view of the conventional illumination apparatus.

FIG. 9 is a sectional side view of a fourth embodiment of the present invention. FIG. 10 is a partial sectional perspective view of the fourth embodiment of the present invention.

The fourth embodiment is similar to the illumination apparatus for the operating section according to the third embodiment in terms of the panel 22, the VR 26, the printed circuit board 5, and the light guiding piece 29. Accordingly, the same components are denoted by the same reference numerals and their detailed description is omitted. The fourth embodiment differs from the third embodiment in an operation knob 21. Three series through-holes 21E are formed in a front plate 21A of the operation knob 21. A bearing section 21D of the operation knob 21, made of a transmission and diffusion material such as an acrylic resin, is fitted into the operation knob 21. The bearing section 21D has a cylindrical portion 21F formed in its central portion and into which a tip portion of the shaft section 26A of the VR 26 if fitted. A bottomed cylindrical main body portion 21G is closely fitted into the operation knob. Convex portions made of a transmission and diffusion material and formed on a front surface of the bearing section 21D are fitted into the respective through-holes 21E, formed in the front plate 21A. Further, in this description, the three through-holes 21E are formed in series. However, the present invention is not limited to this aspect but the positions and number of through-holes may be arbitrary.

In the illumination apparatus for the operating section configured as described above, as in the case of Embodiment 3, a light beam from one light source of the light emitting diode 7 passes through the shaft section 26A of the VR 26 and is incident directly on the bearing section 21D of the operation knob 21, having the transmission and diffusion function. In some cases, the light exits the shaft section 26A, passes through the space in the operation knob 21, and is incident on the bearing section 21D of the operation knob 21. Part of the light incident on the bearing section 21D of the operation knob 21, which has the transmission and diffusion function, exits the operation knob 21 through the through-hole 21E in the knob 21. Further, while being irregularly reflected, part of the light applied directly to the interior of the operation knob 21 is emitted through the through-hole 21E in the front plate 21A of the operation knob 21 as a reflected indirect light. In this embodiment, light is emitted through the outer periphery of the light guiding piece 29 as in the above the embodiment.

In the third and fourth embodiments, the first reflection surface and the second reflection surface may be mirrored. Further, the rear surface of the light guiding piece may be entirely mirrored. Furthermore, one of the inner wall surface of the operation knob and the surface of the panel at the rear surface of the light guiding piece is preferably mirrored so as to operate as a reflection surface.

The above configuration allows light to be also emitted from the front plate 21A of the operation knob 21. Further, the illumination is effectively provided as shown by the illumination reflected beam β.

As described above, according to the present embodiment, light from the light source can be effectively diffusively reflected regardless of the sectional shape of the operation knob 21. Moreover, the illuminated portion can be uniformly illuminated.

INDUSTRIAL APPLICATION

The present invention is an illumination apparatus for an operating section of an electronic equipment such as an audio equipment or a communication equipment, the apparatus diffusively reflecting light from a light source to uniformly illuminate an operating section of an operation knob.

The invention claimed is:

1. An illumination apparatus for an operating section, comprising:

an operation part located on a panel of electronic equipment, an operation knob attached to the operation part so that light from a built-in light emission source illuminates a rear surface of the operation knob, a concave portion opposite an opening in the operation knob of the panel, a light guiding piece located in concave portion to diffusively, transmit the light from the light emission source to illuminate an outer periphery of the rear surface of the operation knob, the light guiding piece comprising a light receiving surface that receives the light from the light emission source and an emission surface that irradiates as front of the light guiding piece with the light from the outer periphery of the rear surface of the operation knob, and a first reflection surface and a second reflection surface that reflect the light outward from the light receiving surface, wherein the light emission source is located above a bearing section of the operation knob, an inner peripheral section of the light guiding piece is thicker than an outer peripheral section, a thicker part of the inner peripheral section is located inside the operation knob, the outer peripheral section is located around an outer periphery of the operation knob, an outer periphery of the outer peripheral section protrudes outward from the outer periphery of the operation knob, a first reflection surface is on a rear surface of the outer peripheral section of the light guiding piece to reflect the light from the light receiving surface radially outward of the light guiding piece, and the second reflection surface is on the rear surface of the outer peripheral section of the light guiding piece to reflect the light reflected by the first reflection surface toward the emission surface.

2. The illumination apparatus for an operating section according to claim 1, wherein at least one of a shaft section of the operation part and a bearing section of the operation knob fitted around the shaft section is a transparent material.

3. The illumination apparatus for an operating section according to claim 1, wherein an internal wall surface of the operation knob is a reflection surface.

4. The illumination apparatus for an operating section according to claim 1, wherein the light receiving surface of the light guiding piece for receiving the light from the light emission surface faces an interior of the operation knob, and the emission surface for emitting the light diffusively passing through the light guiding piece to the front of the light guiding piece is located around an outer peripheral section of the operation knob.

5. The illumination apparatus for an operating section according to claim 4, wherein an outer peripheral section of a front surface of the light guiding piece is a matted emission surface.

6. The illumination apparatus for an operating section according to claim 1, wherein a through-hole is formed in the operation knob so that transmitted or diffused light is emitted through the through-hole.

7. The illumination apparatus for an operating section according to claim 1, wherein the operation knob is an operation button.

8. An illumination apparatus for an operating section, comprising:

an operation part located on a panel of electronic equipment, and an operation knob attached to the operation part so that light from a built-in light emission source illuminates a rear surface of the operation knob, wherein each of a shaft section of the operation part and a bearing section of the operation knob is a transparent material, the apparatus further comprises a light emission source located inside at least one of the shaft section of the operation part and the bearing section of the operation knob, and a light guiding piece is located between the operation knob and the panel to diffusively transmit light from the light emission source to illuminate the outer periphery of the rear surface of the operation knob, an inner peripheral section of the light guiding piece is thicker than an outer peripheral section, a thicker part of the inner peripheral section is located inside the operation knob, the outer peripheral section is located around an outer periphery of the operation knob, an outer periphery of the outer peripheral section protrudes outward from the outer periphery of the operation knob, a first reflection surface is on a rear surface of the outer peripheral section of the light guiding piece to reflect light from light receiving surface radially outward of the light guiding piece, a second reflection surface is on the rear surface of the outer peripheral section of the light guiding piece to reflect the light reflected by the first reflection surface toward an emission surface.

9. The illumination apparatus for an operating section according to claim 8, wherein an internal wall surface of the operation knob is a reflection surface.

10. The illumination apparatus for an operating section according to claim 8, wherein a light receiving surface of the light guiding piece for receiving the light from the light emission surface faces an interior of the operation knob, and an emission surface for emitting the light diffusively passing through the light guiding piece to the front of the light guiding piece is located around an outer peripheral section of the operation knob.

11. The illumination apparatus for an operating section according to claim 10, wherein an outer peripheral section of a front surface of the light guiding piece is a matted emission surface.

12. The illumination apparatus according to claim 8, wherein a concave is located in a panel surface to which the operation part is attached, and the light guiding piece is located the concave.

13. An illumination apparatus for an operating section according to claim 8 wherein a through-hole is formed in the operation knob so that transmitted or diffused light is emitted through the through-hole.

14. The illumination apparatus for an operating section according to claim 8, wherein the operation knob is an operation button.

* * * * *

UNITED STATES PATENT AND TRADEMARK OFFICE

CERTIFICATE OF CORRECTION

PATENT NO. : 7,399,098 B2
APPLICATION NO. : 10/552921
DATED : July 15, 2008
INVENTOR(S) : Hiroshi Nakamoto et al.

It is certified that error appears in the above-identified patent and that said Letters Patent is hereby corrected as shown below:

In the title page, the title should read as follows:

-- (54) ILLUMINATION APPARATUS FOR OPERATING SECTION --

Page 1, column 1, lines 1-2 should read:

-- ILLUMINATION APPARATUS FOR OPERATING SECTION --

Signed and Sealed this

Twenty-sixth Day of August, 2008

JON W. DUDAS
*Director of the United States Patent and Trademark Office*